United States Patent Office 3,131,248
Patented Apr. 28, 1964

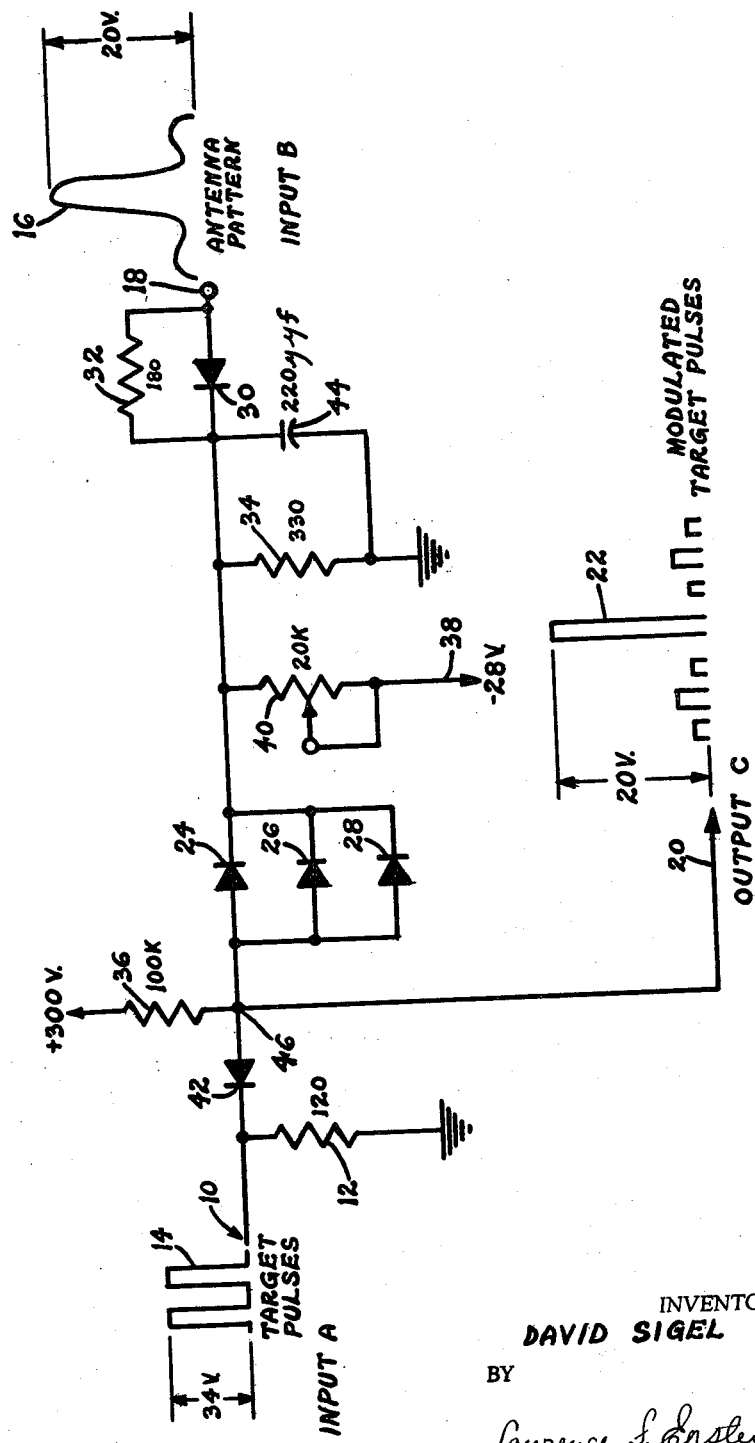

3,131,248
AMPLITUDE MODULATOR
David Sigel, Verona, N.J., assignor, by mesne assignments, to the United States of America as represented by the Secretary of the Navy
Filed Dec. 4, 1961, Ser. No. 157,019
4 Claims. (Cl. 35—10.4)

This invention relates in general to an apparatus for training and is particularly directed towards a device for amplitude modulating a series of pulse signals in order to simulate antenna pattern outputs.

A primary object of the instant invention is to generate a simulated antenna pattern.

Another object of the instant invention is to provide a device which can be utilized to train radar detection crews without dependency upon tactical operations or prevailing weather conditions.

A further object of the instant invention is to provide a device that will generate a simulated modulated antenna pattern which can be utilized to accurately reproduce the operation of an operational radar set.

Other objects and many of the attendant advantages of this invention will be readily appreciated as the same becomes better understood by reference to the following detailed description when considered in connection with the accompanying drawing which is a schematic diagram of the amplitude modulator.

Referring now to the figure, target pulses are applied to the circuit at the input 10 across input resistor 12. These input pulses 14 are equal in height and are applied to the circuit to be modulated by the antenna pattern input 16 which is applied to the circuit at point 18. The object of the circuit is to modulate the target pulses 14 in accordance with the envelope of the antenna pattern 16 so that the output at 20 comprises a series of target pulses 22 modulated in accordance with the antenna pattern 16. Due to the fact that normal diode gating and mixing circuits have undesirable characteristics such as the presence of forward resistance and the non-linear variation of forward resistance, the circuitry of the present invention is arranged to overcome these undesirable characteristics.

It is desired to have a modulator output voltage envelope follow the antenna pattern voltage. To accomplish this it is desired to minimize the forward voltage drop existing across a single diode. The reduction of this voltage drop is achieved by combining three diodes in parallel. These diodes are diodes 24, 26 and 28. In order to compensate for the variation in the forward resistance of diodes, which is appreciable at low voltage operation, a novel network is inserted near input 18. This novel circuit comprises diode 30 in parallel with resistor 32. The parallel resistor 32 acts to reduce the variation in the forward resistance by a factor which is proportional to the combined parallel resistance of resistor 32 with the forward resistance of diode 30 and divided by the forward resistance of diode 30 without the parallel resistor 32 at equivalent voltage levels. At high voltage levels shunt resistor 32 will have little or no effect on the parallel resistance combination of resistor 32 and the forward resistance of diode 30. However, at low voltage levels where the forward resistance of diode 30 will increase to a value of the same order of magnitude as resistor 32, resistor 32 will effectively reduce this increase in forward resistance to maintain the combined parallel resistance fairly constant.

Resistor 34 is the antenna pattern input load resistor. Since this resistor is connected in series with resistor 36 between plus 300 volts and ground, a D.C. positive voltage exists across this resistor 34. The amount of target pulse present across the output is proportional to the D.C. voltage present across the 330 ohms to ground. Since this D.C. level is an appreciable portion of the low operating voltage levels, it is undesirable. It is therefore necessary to negate this D.C. positive level. This is accomplished by applying a D.C. negative bucking voltage from minus 28 volts at point 38 through potentiometer 40 to this D.C. level. This results in a reduction of spurious level and permits the output to operate at virtually ground potential. The target pulses 14 are fed in at point 10 across input voltage load resistor 12 and through diode 42 to the output 20. Capacitor 44 which is parallel across antenna pattern resistor 34 is utilized to shunt to ground high frequencies which have passed through diode 30. Thus, in operation point 46 which is the same as output point 20, is at ground potential due to the operation of the negative potential across potentiometer 40 which bucks the D.C. level caused by the level of target pulses 14. With the application of the antenna pattern the voltage at point 46 will vary in accordance with the antenna pattern thus permitting or presenting modulated target output pulses at output point 20.

Obviously many modifications and variations of the present invention are possible in the light of the above teachings. It is therefore to be understood that within the scope of the appended claims the invention may be practiced otherwise than as specifically described.

What is claimed is:
1. A device to generate simulated modulated antenna pulses comprising a source of target pulses and mixing circuitry, target pulses generated by said target pulse source being operatively connected to said mixing circuitry, said target pulses generating a D.C. level, a source of signals representative of an antenna pattern, said antenna pattern signals source being operatively connected to said mixing circuitry for modulation of said target pulses, and means for mixing said antenna pattern signals and said target pulses whereby said mixing means provide an output which comprises modulated target pulses, said modulated target pulses being in accordance with said input target pulses and said antenna pattern signals, said mixing circuit input for said target pulses comprising an input load resistor and a series diode, said series diode having a low forward voltage drop, wherein said input circuit to said mixing circuit for said antenna pattern signal has inserted in series therewith three parallel diodes for minimizing the forward voltage drop across said series diode.

2. The combination of claim 1 and a negative bucking circuit means connected to said mixing circuit for bucking out the D.C. level generated by said target pulses.

3. The combination of claim 2 and a parallel resistance means connected across said input series diode for reducing the voltage variation of said input series diode with changing voltage levels.

4. The combination of claim 3 and a shunt capacitor connected across said antenna pattern input load resistor for shunting out spurious high frequency signals.

References Cited in the file of this patent

UNITED STATES PATENTS

| | | |
|---|---|---|
| 2,518,341 | Libois | Aug. 8, 1950 |
| 2,698,432 | Blasingame et al. | Dec. 28, 1954 |
| 2,838,734 | Uphoff | June 10, 1958 |
| 2,917,717 | Thorsen | Dec. 15, 1959 |

FOREIGN PATENTS

| | | |
|---|---|---|
| 1,045,455 | Germany | Dec. 4, 1958 |